United States Patent
Shellenberger

(10) Patent No.: US 10,118,118 B2
(45) Date of Patent: Nov. 6, 2018

(54) FILTERING SYSTEM AND A GAS FLOW CONTROL DEVICE

(71) Applicant: AMEC FOSTER WHEELER NORTH AMERICA CORP., Hampton, NJ (US)

(72) Inventor: Jeffrey Shellenberger, Pittsburgh, PA (US)

(73) Assignee: Amec Foster Wheeler Industrial Power Company, Inc., Hampton, NJ (US)

(*) Notice: Subject to any disclaimer, the term of this patent is extended or adjusted under 35 U.S.C. 154(b) by 245 days.

(21) Appl. No.: 15/172,674

(22) Filed: Jun. 3, 2016

(65) Prior Publication Data
US 2017/0348625 A1 Dec. 7, 2017

(51) Int. Cl.
| | |
|---|---|
| B01D 19/00 | (2006.01) |
| B01D 46/00 | (2006.01) |
| B01D 46/42 | (2006.01) |
| F02D 9/10 | (2006.01) |
| B01D 46/02 | (2006.01) |

(52) U.S. Cl.
CPC ....... B01D 46/0041 (2013.01); B01D 46/002 (2013.01); B01D 46/02 (2013.01); B01D 46/4272 (2013.01); F02D 9/101 (2013.01); B01D 2267/70 (2013.01); B01D 2273/16 (2013.01)

(58) Field of Classification Search
CPC . B01D 46/00; B01D 46/0002–46/0009; B01D 46/0019–46/0026; B01D 46/0041; B01D 46/02; B01D 46/2411–46/2455; B01D 46/4272; B01D 2267/70; B01D 2273/16; F02D 9/101

USPC ............ 55/282–305, 341.1–341.7, 418–420
See application file for complete search history.

(56) References Cited

U.S. PATENT DOCUMENTS

| | | | |
|---|---|---|---|
| 3,808,776 A * | 5/1974 | Jesernig | B01D 46/0075 55/300 |
| 6,451,091 B1 | 9/2002 | Aviña | |
| 2009/0120292 A1 | 5/2009 | Foster | |

FOREIGN PATENT DOCUMENTS

| | | |
|---|---|---|
| DE | 10 317 505 A1 | 1/2005 |
| DE | 10 2009 026 797 A1 | 12/2010 |

OTHER PUBLICATIONS

Notification of and Transmittal of the International Search Report and Written Opinion dated Aug. 4, 2017, in corresponding International Patent Application No. PCT/IB2017/053034.

* cited by examiner

*Primary Examiner* — T. Bennett McKenzie
(74) *Attorney, Agent, or Firm* — Fitzpatrick, Cella, Harper & Scinto

(57) ABSTRACT

A gas flow control device and a filtering system for a flow of dust-laden gas. The gas flow control device includes a damper blade arranged to be pivoted through a definite pivoting angle around a substantially horizontal pivot axis, for regulating the flow of the dust-laden gas in an inlet channel by pivoting the damper blade between an open position and a closed position. At least one substantially planar guide baffle is attached to each of two opposite, substantially planar surfaces of the damper blade, the at least one guide baffle extending from the pivot axis in the direction of the normal of the general plane of the damper blade substantially to an opposite inner surface of the inlet channel, for controlling the distribution of the dust-laden gas flow to a fabric filter enclosure.

18 Claims, 8 Drawing Sheets

FILTERING SYSTEM AND A GAS FLOW CONTROL DEVICE

BACKGROUND OF THE INVENTION

Field of the Invention

The present invention relates to a filtering system for a flow of dust-laden gas and a gas flow control device. The present invention relates especially to a filtering system comprising a fabric filter enclosure having at least one inlet opening, a gas plenum having a first main flow direction and at least one gas outlet opening in a vertical side wall of the gas plenum for feeding the dust-laden gas to the fabric filter enclosure, and an inlet channel from the at least one outlet opening to the at least one inlet opening, the inlet channel having a substantially horizontal second main flow direction differing from the first main flow direction, an inner surface, and a gas flow control device.

Description of the Related Art

Fabric filters are commonly used in industrial processes for removing small particles, i.e., dust, from a flow of gas, such as the flue gas of a power boiler. Fabric filters are thus often exposed to high inlet velocity of the gas and abrasive dust, which may result in filter bag failures and wearing of the structures in the filter enclosure. Such damage can be severely increased by a poor inlet flow distribution of the dust-laden gas to the filter enclosure, which would cause localized areas of higher than average gas velocity and greater risk of abrasion damage. The gas is usually conveyed to the fabric filter enclosure via an inlet plenum that receives the gas from an upstream unit, such as a power boiler, and directs the gas to the fabric filter enclosure through multiple inlet channels.

The filter bags are often arranged into separate filter compartments, and the inlet channels and gas flow control devices comprise damper blades to enable isolation of the filter compartments. The inlet channels may be curved and relatively long, leading from openings at the bottom of the inlet plenum to the lower portion of the fabric filter enclosure. However, according to an especially simple and preferential construction, a so-called side-entry style construction, relatively short inlet channels lead substantially horizontally from a vertical side wall of the inlet plenum to side openings in the fabric filter enclosure, which requires less material and is easier to construct than the inlet channel style leading from the openings at the bottom of the inlet plenum.

The gas plenum usually has a first main flow direction and the inlet channels have a second main flow direction that is transverse to, or at least differs from, the first main flow direction. Because the gas flow thus makes a turn when coming to the inlet channels, the distribution of the gas flow entering the fabric filter enclosure can be heavily skewed to the, in the first main flow direction, downstream side of the inlet channels. Such a skewed flow distribution of the dust-laden gas leads to localized areas of high gas velocity and abrasion that can damage the steel structures and filter bags in the fabric filter enclosure. There is thus a need to control the flow of the gas and dust particles so as to provide a more balanced flow distribution. A known solution for controlling the flow distribution is to arrange multiple guide vanes, or guide baffles, extending in the second main flow direction, at the upstream end of the inlet channels, if the inlet channel is sufficiently long to provide space for the guide vanes without obstructing the rotation of the damper blade. However, especially the relatively short inlet channels of a side-entry style construction do not have space for guide vanes due to the obstruction of the gas flow control device damper blade rotation.

An object of the invention is to provide a simple filtering system and a gas flow control device in which at least some of the disadvantages of the prior art are minimized.

SUMMARY OF THE INVENTION

According to one aspect, the present invention provides a filtering system for a flow of dust-laden gas, comprising a fabric filter enclosure having at least one inlet opening, a gas plenum having a first main flow direction and at least one gas outlet opening in a vertical side wall of the gas plenum for feeding the dust-laden gas to the fabric filter enclosure, and an inlet channel from the at least one outlet opening to the at least one inlet opening, the inlet channel having a substantially horizontal second main flow direction differing from the first main flow direction, an inner surface, and a gas flow control device, wherein the gas flow control device comprises a damper blade arranged in the inlet channel and having a general plane and two opposite, substantially planar surfaces with a shape fitted to enable closing of the inlet channel, and two opposite end edges, the damper blade being arranged to be pivoted through a definite pivoting angle around a substantially horizontal pivot axis, wherein the pivot axis is perpendicular to the second main flow direction and passes adjacent to the end edges of the damper blade so as to divide the damper blade to two end sections, for regulating the flow of the dust-laden gas in the inlet channel by pivoting the damper blade between an open position, wherein the general plane of the damper blade is parallel to the second main flow direction, and a closed position, and at least one substantially planar guide baffle is attached to each of the two substantially planar surfaces of the damper blade at a distance from the end edges of the damper blade, the at least one guide baffle extending in the open position of the damper blade substantially parallel to the second main flow direction and from the pivot axis in the direction of the normal of the general plane of the damper blade substantially to an opposite inner surface of the inlet channel, for controlling the distribution of the dust-laden gas flow to the fabric filter enclosure.

The flue gas filtering system according to the present invention provides a new way of arranging guide baffles for controlling the distribution of the gas flow to the fabric filter enclosure without having to increase the length L of the inlet channel. Guide baffles according to the present invention efficiently control the flow distribution of the dust-laden gas so as to balance the flow distribution and minimize dust abrasion damage. By attaching the guide baffles to each of the two opposite surfaces of the damper blade, it is possible to have the functionality of the damper with efficient flow distribution control, without any need to extend the length of the inlet channels, which increases the footprint of the overall filtering system. The guide baffles according to the present invention can be made to extend in the second main flow direction, in the direction of the inlet channels, over most of the length of the damper blade. Due to the relatively small number of long guide baffles required with the present invention, they are typically simpler to manufacture and to maintain than an alternative with a longer inlet channel and conventional short guide baffles arranged in a high number upstream of the damper blades.

The advantages of the present invention can be achieved even in a case of a filtering system comprising a single inlet channel between an outlet opening of a gas plenum and an inlet opening of a fabric filter enclosure, but, in practice, the filtering system usually comprises a fabric filter enclosure with multiple inlet openings, a gas plenum with multiple gas outlet openings, and an inlet channel from each of the multiple outlet openings to one of the inlet openings. In a typical application, the flue gas filtering system comprises two fabric filter enclosures having multiple inlet openings and a single flue gas plenum between the fabric filter enclosures. Thereby, the flue gas plenum has multiple gas outlet openings in each of two opposite vertical side walls of the gas plenum for feeding the flue gas to each of the two fabric filter enclosures through substantially horizontal inlet channels leading from each of the multiple outlet openings to one of the multiple inlet openings.

Because the purpose of the damper blades is to enable closing of the respective inlet channels, the damper blades have a general shape that corresponds to the cross section of the inlet channels. The shape of the damper blades and the cross section of the inlet channels can vary, but usually, the inlet channels have a rectangular cross section and the shape of the damper blades equals the cross section of the inlet channels.

In one case, the damper blade comprises two pieces of steel plates, one for each side of the blade, the pivot axis may preferably pass through the center points of two opposite end edges of the damper blade. In another case, the damper blade comprises only a single steel plate, the pivot axis usually does not pass through end edges of the damper blade, but only closely adjacent to two opposite end edges, or center points of two opposite end edges, of the damper blade. In one case, the pivot axis passes through the center points of two opposite end edges, the pivot axis is thus a symmetry axis of the damper blade, i.e., the end sections of the damper blade on the opposite sides of the pivot axis are identical, and the damper blade is arranged to be pivoted symmetrically around the pivot axis. In some applications, it may, however, also be possible that the pivot axis does not pass through or adjacent to the center points of the opposite end edges of the damper blade, and the damper blade is arranged to be pivoted non-symmetrically around the pivot axis.

In principle, one guide baffle is attached to each side of the damper blade, i.e., to each of the two opposite, substantially planar surfaces of the damper blade, already improves the flow distribution of the gas. According to a preferred embodiment of the present invention, however, multiple guide baffles, such as two to six guide baffles, are attached to each of the opposite surfaces of the damper blade. The controlling of the flow distribution can generally be improved by increasing the number of guide baffles, but, because the guide baffles can have, when the damper blade is in the open position, a relatively long extent in the second main flow direction, the optimum number of guide baffles is usually clearly less than when using conventional short guide vanes arranged at the upstream end of the inlet channel.

According to a preferred embodiment of the present invention, the length L of the inlet channels is shorter than their height H. Such short inlet channels render it possible to make an especially compact and simple fabric filter system. Especially, when using such short inlet channels, the damper blades and the guide baffles attached to the damper blades are advantageously arranged to protrude in the open position of the damper blades to the inlet plenum, which still improves the controlling of the distribution of gas and dust particles in the inlet channel.

The shape of the guide baffles can vary, but it is desired that the damper blades have, when the damper blade is in the open position, an extent in the second main flow direction that is long enough for sufficient controlling of the flow distribution. Most preferably, the guide baffles extend in the second flow direction over most of the length of the damper blade. According to the present invention, each guide baffle extends from the pivot axis in the direction of the normal of the general plane of the damper blade substantially to an opposite inner surface of the inlet channel. Thereby, each pair of guide baffles, attached to the two planar surfaces of the damper blade, provides an efficient gas flow distribution controlling capacity by extending, when the damper blade is in the open position, substantially to the ceiling and bottom of the inlet channel.

Because the purpose of the damper blade is to enable closing of the respective inlet channel, the inner surface of the inlet channel is preferably equipped with a frame-like structure, a so-called frame, extending around a cross section of the inlet channel, so as to form a sealing surface to the damper blade. Since the pivoting of the damper blade cannot be continued beyond the sealing surface, the total pivoting angle of the damper blade is usually at most one hundred eighty degrees, ninety degrees in each direction from the open position. It is to be noted that by the expressions of "extends . . . to an opposite inner surface" and "extending . . . to the ceiling and bottom" above is meant extending to the innermost part of the inner surface, which in practice is usually the innermost edge of the frame.

According to a preferred embodiment of the present invention, the total pivoting angle is about one hundred eighty degrees. In such a case, the guide baffles advantageously extend in all directions from the pivot axis a distance that is at most the distance from the pivot axis to the opposite inner surface of the inlet channel. By such guide baffles is obtained that the guide baffles do not prevent the required pivoting of the damper blades. In order to maximize the size of the guide baffles in the vicinity of the inner surface of the inlet channel, the guide baffles preferably comprise an arcuate section, having the pivot axis as the center point and including the normal of the general plane of the damper blade that passes through the pivot axis, wherein the arcuate section has a radius substantially equalling the distance from the pivot axis to the opposite inner surface of the inlet channel. According to an even more preferred embodiment of the present invention, the guide baffles have a half-circular shape with a radius substantially equalling the distance from the pivot axis to the opposite inner surface of the inlet channel. Such guide baffles provide a maximum size, and flow distribution controlling effect, of all guide baffles attached to a damper blade with total pivoting angle of about one hundred eighty degrees.

It is also possible, at least in some applications of the present invention, that the gas flow control device also comprises at least one additional guide baffle extending substantially parallel to the second main flow direction, attached to the inner surface of the inlet channel. Such additional guide baffles may not prevent the desired pivoting of the damper blade, and therefore, in the case of the damper blade having total pivoting angle of about one hundred eighty degrees, the additional guide baffles can be present only in a region that is at a distance from the pivot axis that is greater than the distance from the pivot axis to the opposite inner surface of the inlet channel.

According to another preferred embodiment of the present invention, the total pivoting angle of the damper blade is limited to ninety degrees, from the open position to the closed position in one direction only. When the pivoting angle is limited to ninety degrees, the damper blade does not cover more than about a half of a whole circle during the pivoting. Thus, when the damper blade is pivoted between the open position and the closed position, each of the two end sections of the damper blade covers a pivoting sector of about ninety degrees, as seen from the pivoting axis. Correspondingly, the guide baffles do not prevent the desired pivoting if they extend, when the damper blade is in the open position, in the respective pivoting sector from the pivot axis a distance that is at most the distance from the pivot axis to the opposite inner surface of the inlet channel. According to a preferred embodiment of the present invention, the guide baffles have, in the respective pivoting sector, when the damper blade is in the open position, a shape of a quarter of a circle, with a radius equalling the distance from the pivot axis to the opposite inner surface of the inlet channel.

On the other hand, for a damper blade having a total pivoting angle of ninety degrees, there is no corresponding limitation to the extent of the guide baffles outside of the pivoting sector. Thus, according to a preferred embodiment of the present invention, when the damper blade is in the open position, the guide baffles can extend in a section outside of the respective pivoting sector from the pivot axis a distance that is greater than the distance from the pivot axis to the opposite inner surface of the inlet channel. By such extensions, it is possible to still improve the gas flow distribution controlling capacity of the guide baffles. The maximum size of the extensions is a square with a side length equalling the distance from the pivot axis to the opposite inner surface of the inlet channel.

According to another preferred embodiment of the present invention, the gas flow control device also comprises at least one additional guide baffle arranged outside of the pivoting sectors of the end sections of the damper blade, the at least one additional guide baffle being attached to the inner surface of the inlet channel and extending substantially parallel to the second main flow direction. Such additional guide baffles can have different shapes and sizes. An additional guide baffle can advantageously have a rectangular shape and extend from the inner surface of the inlet channel a distance that is at most as great as the distance from the pivot axis to the opposite inner surface of the inlet channel.

According to another aspect, the present invention provides a gas flow control device, for controlling the flow of gas in a flow channel having an inner surface and a substantially horizontal main flow direction, comprising a damper blade arranged in the flow channel and at least one substantially planar guide baffle attached to each of the two substantially planar surfaces of the damper blade, according to any of the embodiments described above when discussing filtering systems for a flow of dust-laden gas.

The above brief description, as well as further objects, features, and advantages of the present invention will be more fully appreciated by reference to the following detailed description of the currently preferred, but nonetheless, illustrative, embodiments in accordance with the present invention, when taken in conjunction with the accompanying drawings.

DETAILED DESCRIPTION OF THE INVENTION

Figure 1A:
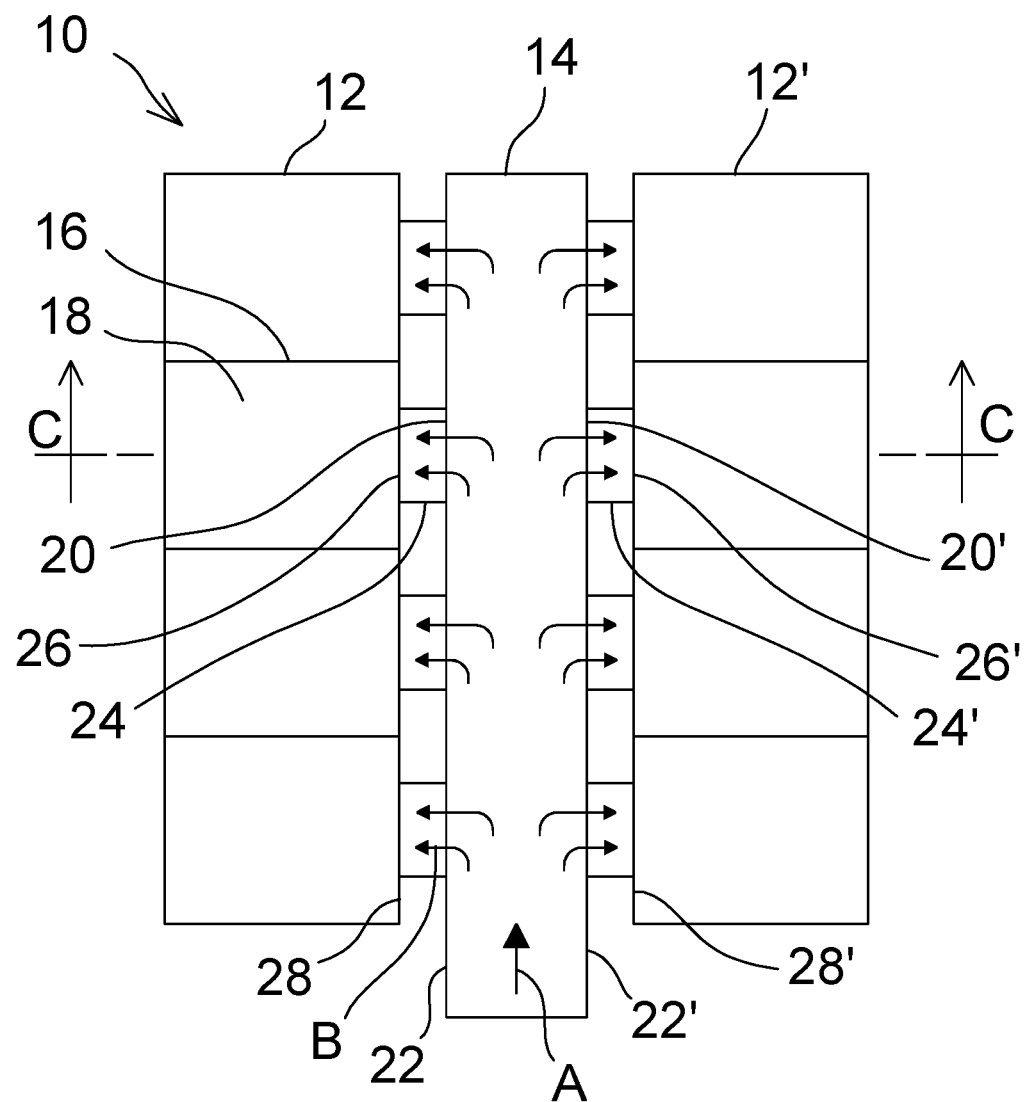
FIGS. 1a and 1b schematically show a horizontal and a vertical cross section of a filtering system comprising a gas flow control device according to an embodiment of the present invention.

FIG. 1a schematically shows a horizontal cross section of a filtering system 10 for a flow of dust-laden gas, comprising two fabric filter enclosures 12, 12' arranged on two sides of a gas plenum 14. The fabric filter enclosures 12, 12' are divided by partition walls 16 to multiple filter compartments 18. FIG. 1a shows three partition walls 16 in each of the fabric filter enclosures, which enclosures are thus divided into four filter compartments, but the number of partition walls and filter compartments can naturally vary, depending on the needs in each case. The gas plenum 14 comprises multiple outlet openings 20, 20' arranged on its vertical sidewalls 22, 22'. A horizontal inlet channel 24, 24' leads directly from each of the outlet openings 20, 20' to corresponding inlet openings 26, 26' in the sidewalls 28, 28' facing the gas plenum 14 of the fabric filter enclosures 12, 12'. FIG. 1a shows one inlet channel leading to each filter compartment 18, but alternatively, there could be, for example, two inlet channels to each filter compartment 18.

Arrow A shows the flow direction, a so-called first main flow direction, of the dust-laden gas coming from an upstream unit, such as a power boiler, not shown in FIG. 1a, in the gas plenum 14. The gas stream is divided in the gas plenum 14, into multiple sub-streams to flow through different inlet channels 24, 24', each having a flow direction, indicated by arrows B, a so-called second main flow direction, transverse to the first main flow direction A. The height of the inlet channel 14, not shown in FIG. 1, is conventionally made in the first main flow direction decreasing, in order to distribute the gas evenly to all the inlet channels 24, 24'. In addition to the need to distribute the gas evenly to the inlet channels, and to the filter compartments, there is also a need to distribute the dust-laden gas as evenly as possible within each inlet channel 24, 24', because it has in practice been noticed that an uneven distribution of the dust-laden gas in the inlet channels may lead to severe local damage in the actual filter bags and even in the internal steel structures, not shown in FIG. 1a, within the fabric filter enclosures 12, 12'.

Figure 1B:
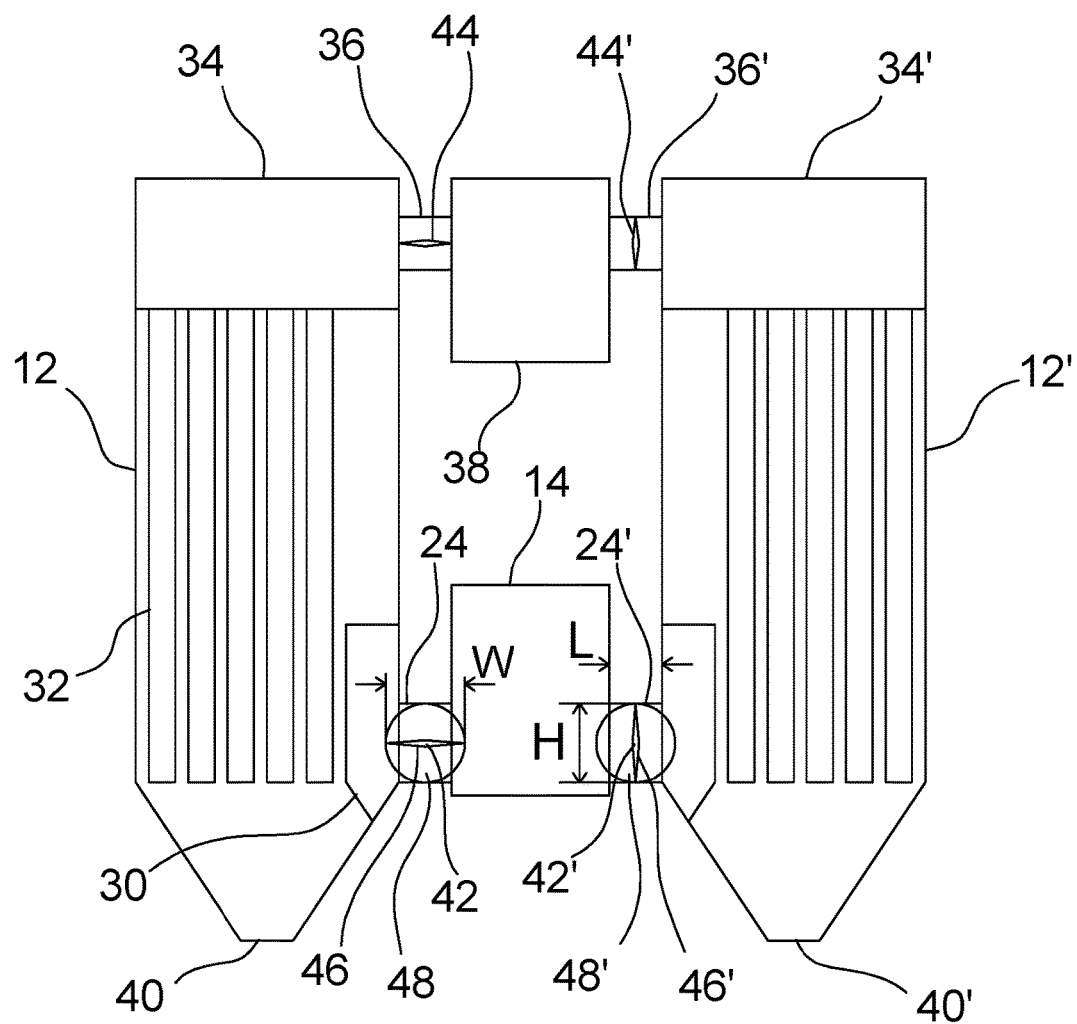

FIG. 1b schematically shows a vertical cross section C-C of the filtering system 10 of FIG. 1a. FIG. 1b shows more clearly how the dust-laden gas flows from the inlet plenum 14 through inlet channels 24, 24' to the filter enclosures 12, 12'. The filter enclosures may advantageously comprise erosion control baffle plates 30 to protect the filter bags 32 from direct impact of the dust-laden gas. The gas flows in the filter enclosures 12, 12' across the fabric material of the filter bags 32 to a clean gas plenum 34, 34', and from there through outlet channels 36, 36' to an outlet manifold 38. The clean gas plenums 34, 34' are conventionally divided into compartments, corresponding to the compartments 18 of the fabric filter enclosures 12, 12, and there is naturally at least one outlet channel 36, 36' from each of the clean gas plenum compartments to the outlet manifold 38. The clean gas plenums 34, 34' usually comprise equipment for conventional pulse air cleaning, not shown in FIG. 1b, of the filter bags 32. Dust material collected on the outer surface of the filter bags 32 is removed therefrom by the air pulses so as to be collected to the bottom hoppers 40, 40', from where it is disposed in a conventional way.

Both the inlet ducts 24, 24' and outlet ducts 36, 36' comprise gas flow control devices 42, 42', 44, 44' that enable closing the respective inlet and outlet ducts to render possible isolating the individual filter compartments 18, 18' for on-line cleaning and servicing purposes. In FIG. 1b, as an exemplary operating condition, the gas flow control devices 42, 44 in the leftmost inlet and outlet channels 24, 36 are in the open position, to enable free flow of the gas to the filter compartment 12, whereas, the gas flow control devices 42', 44' in the rightmost inlet and outlet channels 24', 36' are in the closed position. The gas flow control devices 44, 44' in the outlet channels 36, 36' are simple damper blades, but the gas flow control devices 42 in the inlet channels 24, 24' comprise damper blades 46, 46' and guide baffles 48, 48' attached to the damper blades 46, 46', as will be described in detail below.

As can be seen in FIG. 1b, the width W of the damper blades 46, 46' advantageously equals the height H of the inlet channels 24, 24', so as to enable closing the inlet channels by single damper blades. In order to keep the filtering system compact, the length L of the inlet channels is advantageously shorter than the height H. This has the effect that the damper blades 46, and possibly also the guide baffles 48, in an open position protrude to at least one of the inlet plenum 14 and the filter enclosures 12, 12'.

Figure 2A:
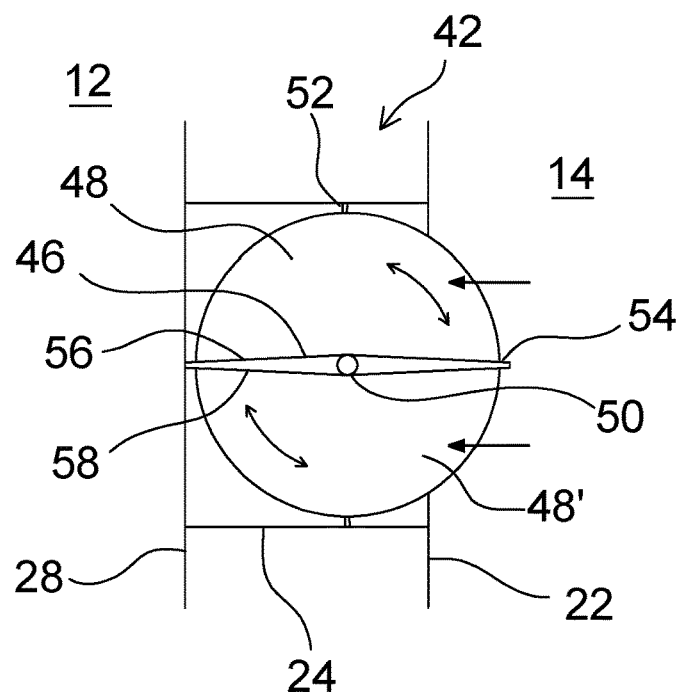
FIGS. 2a and 2b schematically show a vertical cross-sectional view of a gas flow control device in open and closed positions according to an embodiment of the present invention.
Figure 2B:
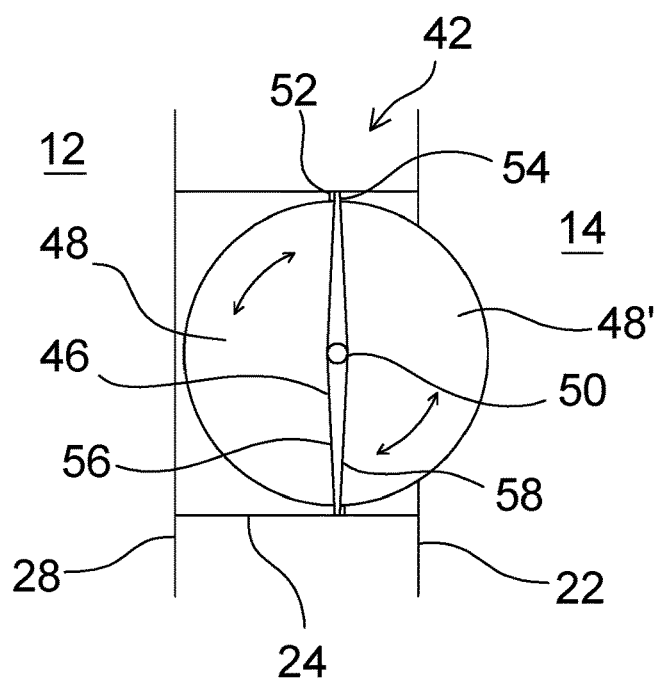

FIGS. 2a and 2b show more in detail a vertical cross section of a gas flow control device 42 according to an embodiment of the present invention, in open and closed positions, respectively. In FIGS. 2a and 2b, the pivot axis 50 of the damper blade 46 is located horizontally in the inlet channel 24, closer to the inlet plenum 14 than to the filter enclosure 12. Therefore, the damper blade 46 protrudes in the inlet plenum 14 but not to the filter enclosure 12. FIGS. 2a and 2b show a frame 52 that extends around the cross section of the inlet channel 24 to enable closing the channel 24 by pivoting the damper blade so that the edges 54 of the damper blade are pressed against the frame 52, as shown in FIG. 2b. Due to the frame 52, the damper blade 46 can be pivoted from the open position around the axis 50 in clockwise or counter-clockwise direction by about ninety degrees, i.e., in total, about one hundred eighty degrees. The two substantially planar surfaces 56, 58 of the damper blade 46, which are in the open position shown in FIG. 2a as upper surface 56 and lower surface 58, can thus be in the closed position, so that the upper surface is towards the filter enclosure 12 and the lower surface is towards the inlet plenum 14, as a FIG. 2b, or vice versa.

FIGS. 2a and 2b show a half-circular guide baffle 48, 48' attached to each of the two substantially planar surfaces 56, 58 of the damper blade 46. Actually, there are typically multiple such guide baffles, advantageously, two to six guide baffles, attached to the surfaces of the damper blade to control the flow distribution, i.e., to prevent the flow of the gas and dust particles from accumulating in the first main flow direction downstream end of the inlet channel 24.

Figure 3:
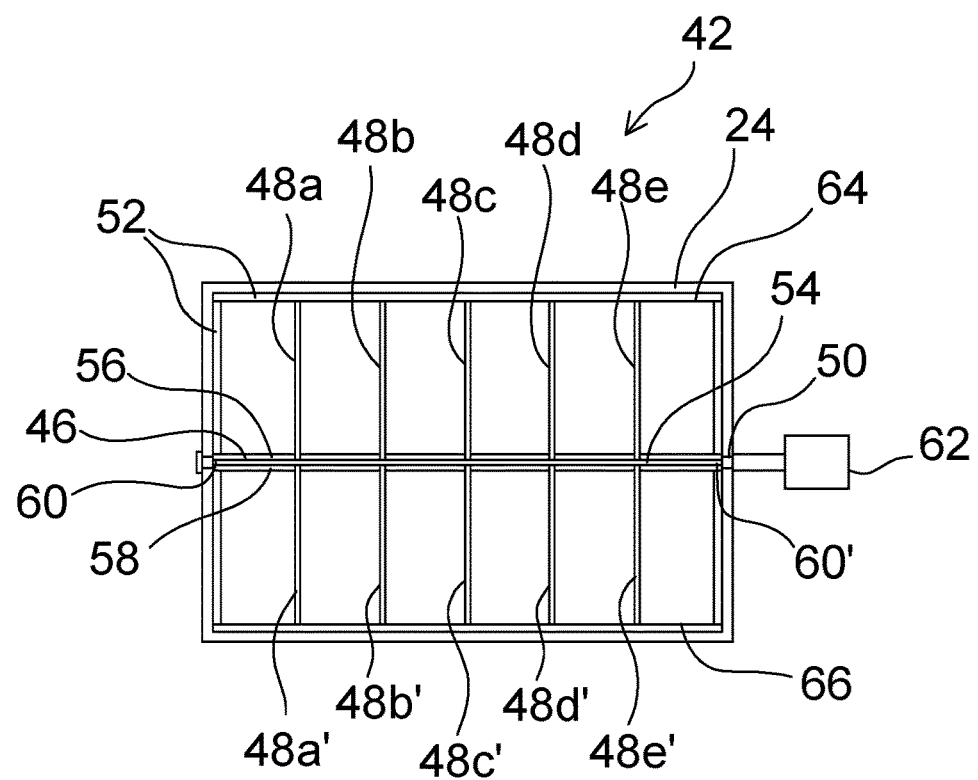
FIG. 3 schematically shows vertical cross-sectional view in the direction of an inlet channel of a gas flow control device according to a preferred embodiment of the present invention.

FIG. 3 shows a vertical cross-sectional view, i.e., a view as seen in the second main flow direction, of a gas flow control device 42 arranged in the inlet channel 24 with a damper blade 46 in the open position, as in FIG. 2a. FIG. 3 shows five guide baffles 48a-48e, 48a'-48e' attached on both substantially planar surfaces 56, 58 of a damper blade 46. The guide baffles are located side by side, at regular intervals, in the direction of the axis 50, so that even the outermost baffles 48a, 48e, 48a', 48e' are at a distance from the end edges 60, 60' of the damper blade. FIG. 3 shows also a frame 52, towards which the end edges 54, 60, 60' of the damper blade 46 are pressed in the closed position of the damper blade, and a device 62, such as a hydraulic motor, used to pivot the damper blade 46, as desired.

Attaching the guide baffles 48 directly to the surfaces of the damper blades 46 renders it possible to use relatively large and, thus, efficient guide baffles in straight and relatively short inlet channels 24. An efficient guide baffle extends advantageously in the open position of the damper blade from the pivot axis 50 substantially to an opposite inner surface of the inlet channel, i.e., to the ceiling 64 and bottom 66 of the inlet channel, or, more precisely, of the frame 50. In order to allow pivoting of a damper blade for full pivoting angle of about one hundred eighty degrees, i.e., ninety degrees in the clockwise or the counter-clockwise direction from the open position, the guide baffles attached to damper blade extend from the pivot axis a distance that is at most the distance from the pivot axis to the opposite inner surface of the inlet channel, in all directions in the plane of the guide baffle. FIGS. 2a and 2b show a preferred embodiment, wherein the guide baffles 48, 48' extend in all directions to their maximal extent, i.e., the guide baffles are half-circular.

Figure 4:
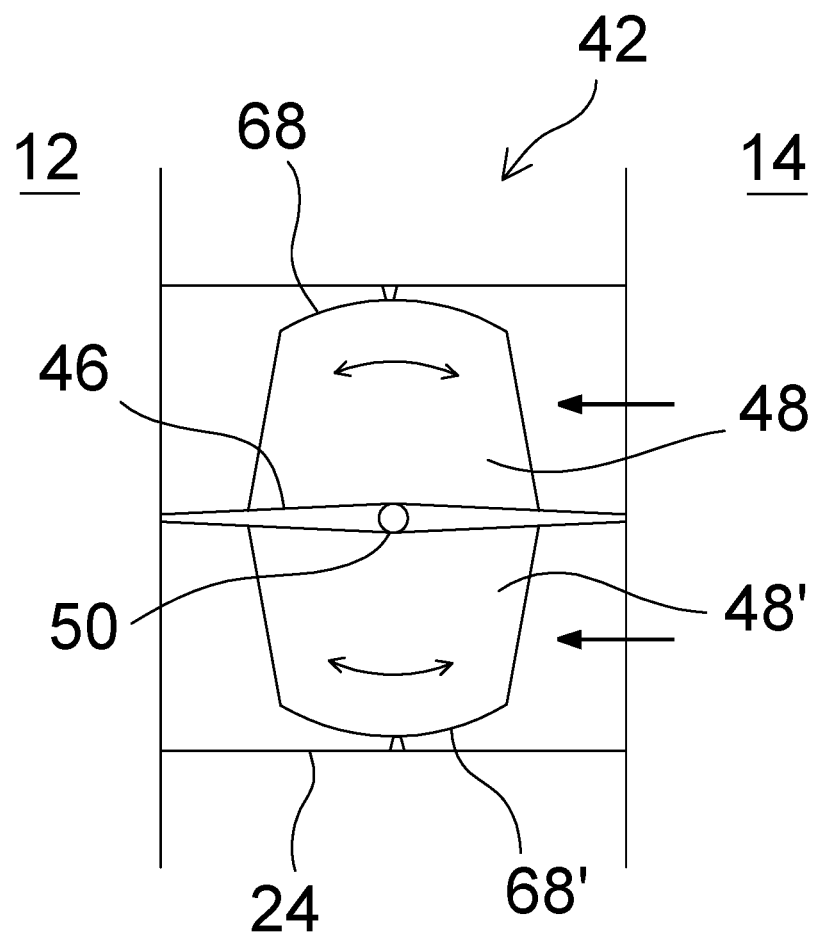
FIG. 4 schematically shows a vertical cross-sectional view of a gas flow control device according to second preferred embodiment of the present invention.

FIG. 4 shows another preferred embodiment of a gas flow controlling device 42, wherein the guide baffles 48, 48' attached to a damper blade 46 have a shape with an arcuate section 68, 68' symmetrically around the normal of the general plane of the damper blade 46 passing through the pivot axis 50. Thus, the arcuate section has the pivot axis 50 as the center point, and a radius substantially equalling the distance from the pivot axis to the opposite inner surface of the inlet channel. The rest of a half-circular shape is then cut away in a suitable way.

Figure 5:
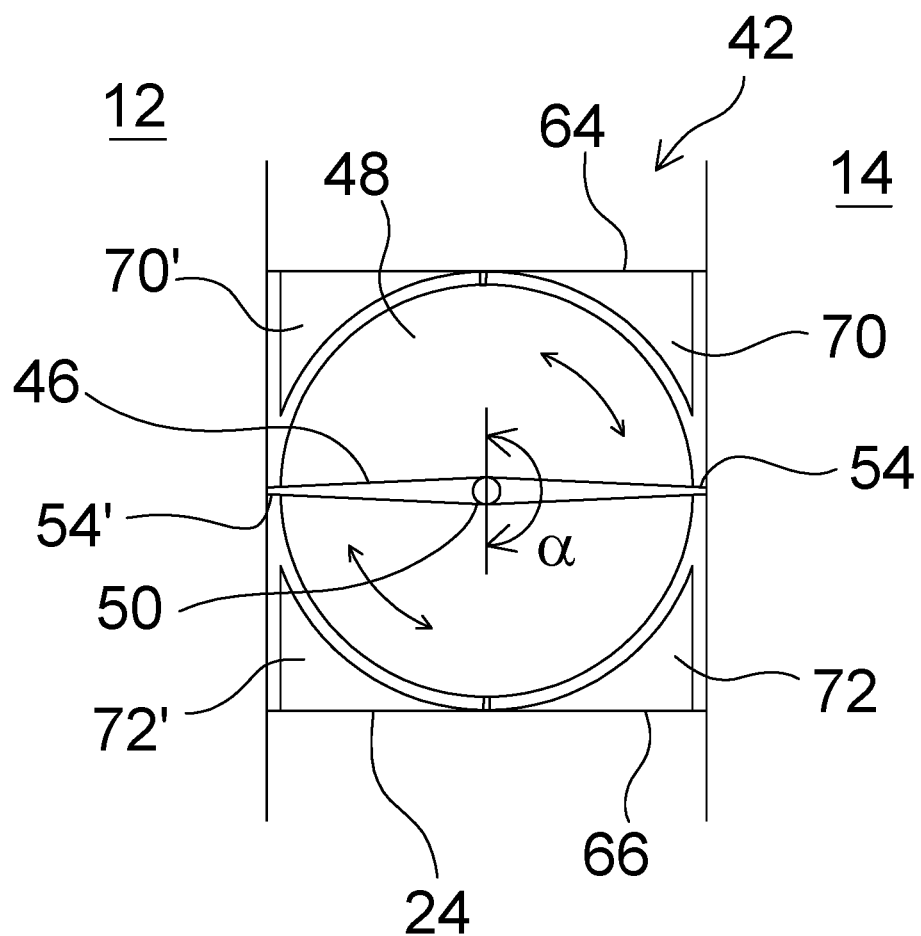
FIG. 5 schematically shows a vertical cross-sectional view of a gas flow control device according to a third preferred embodiment of the present invention.

FIG. 5 shows an embodiment of a flow control device 42 according the present invention that comprises, in addition to the guide baffles 48 attached to the damper blade 46, also upper additional guide baffles 70, 70' attached to an upstream and a downstream portion of the ceiling 64 of the inlet channel 24, respectively, and lower additional baffles 72, 72' attached to an upstream and a downstream portion of the bottom 66 of the inlet channel 24, respectively. The additional guide baffles 70, 70', 72, 72' are advantageously positioned at corresponding locations around the axis 50 as the guide baffles 48 attached to the damper blade 46, but, in some applications, it is also possible to locate the additional guide baffles 70, 70', 72, 72' at different locations around the axis 50 than the guide baffles 48 attached to the damper blade 46.

In FIG. 5, the additional baffles 70, 70', 72, 72' have a curved shape, partially complementing the shape of the guide baffles 48 attached to the damper blade 46. The additional guide baffles can in practice alternatively have different shapes which, however, advantageously provide additional flow distribution control, especially near the bottom 66 and ceiling 64 of the inlet channel 24. A requirement for the additional guide baffles 70, 70', 72, 72' is that they may not prevent the desired pivoting of the damper blade 46, i.e., the additional guide baffles shall not extend to the region where the end edges 54, 54' of damper blade 48 reach during the pivoting of the damper blade 46 throughout the pivoting angle range a.

Previous figures depict damper blades that can be symmetrically pivoted, clockwise or counter-clockwise, from the open position, and, therefore, the guide baffles attached the damper blades are also advantageously symmetrical. It is, however, naturally also possible to close the inlet channel with a damper blade that is pivoted from the open position in one direction only, for example, only in the counter-clockwise direction. Such a damper blade has the advantage that to it can be attached non-symmetrical guide baffles that provide even more efficient flow distribution control than the guide baffles described above.

Figure 6A:
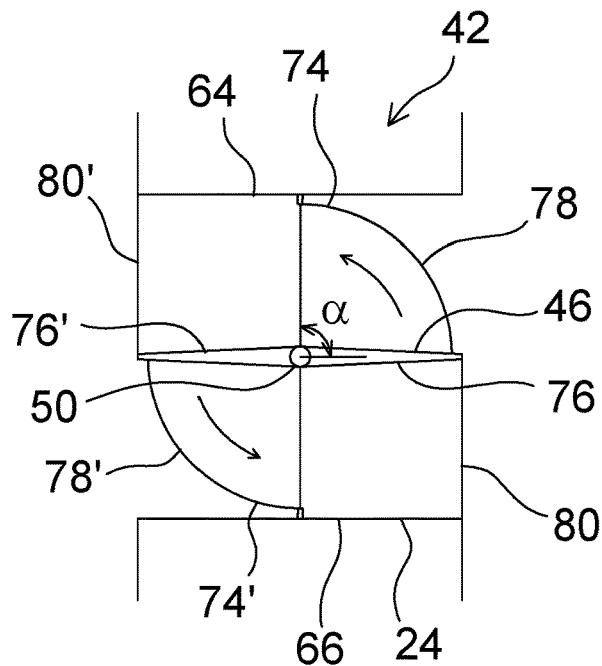
FIGS. 6a and 6b schematically show a vertical cross-sectional view of a gas flow control device in open and closed positions according to a fourth preferred embodiment of the present invention.
Figure 6B:
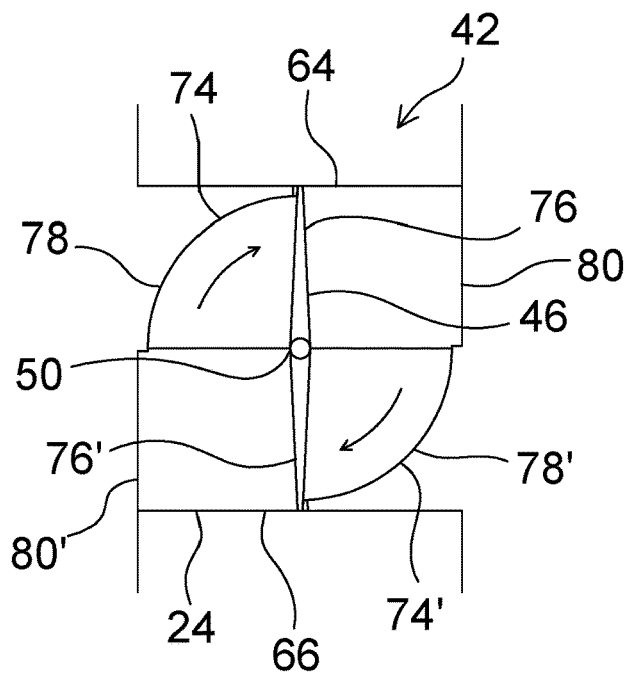

FIGS. 6a and 6b show in an open position and a closed position, respectively, a gas flow control device 42 with a damper blade 46 that has a pivoting angle range limited to ninety degrees, i.e., the damper blade can only be pivoted counter-clockwise from the open position. Thus, the guide baffles 74, 74' attached to the damper blade 46 have in a sector of ninety degrees counter clockwise from the two end sections 76, 76' of the damper blade a section 78, 78' of the shape of a quarter of a circle, with a radius equalling the distance from the pivot axis 50 to the opposite inner surface 64, 66, or to a frame in the opposite inner surface, of the inlet channel 24. In the two other sectors of ninety degrees, the guide baffles comprise a section 80, 80' with a shape of a square with a side length equalling to the distance from the pivot axis 50 to the ceiling 64 or bottom 66 of the channel 24. The square-like baffle portions can alternatively be replaced by any other smaller shape, i.e., a shape that fits in the inlet channel 24 both when the damper blade 46 is in the open position and in the closed position. Since the guide baffles 74, 74' described above generally have a greater extent in the second flow direction than half circular guide baffles described above, they have an especially high gas flow distribution controlling efficiency.

Figure 7A:
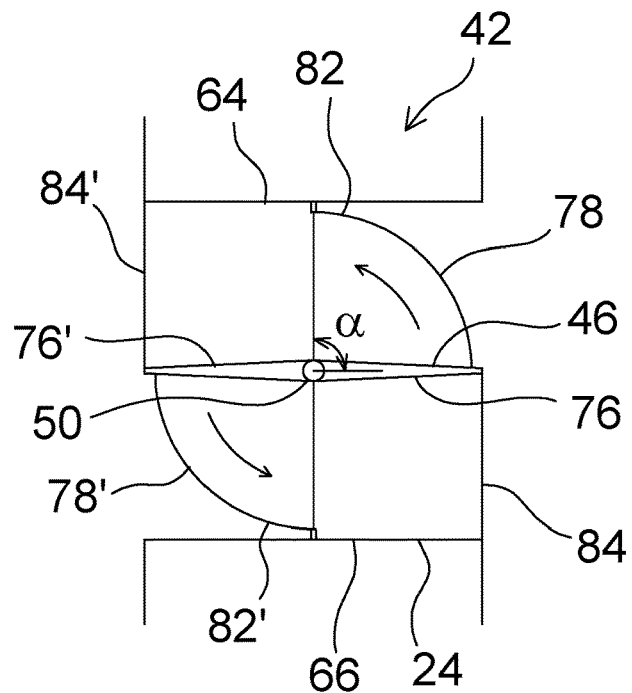
FIGS. 7a and 7b schematically show a vertical cross-sectional view of a gas flow control device in open and closed positions according to a fifth preferred embodiment of the present invention.
Figure 7B:
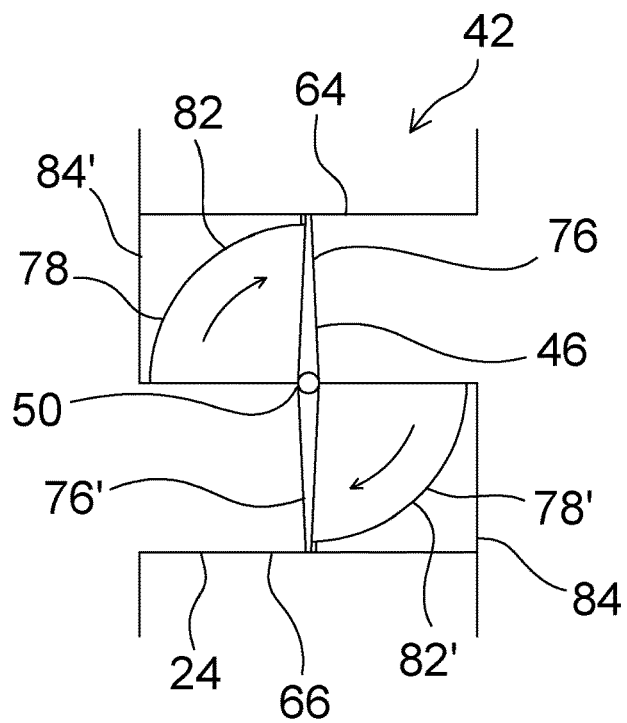

FIGS. 7a and 7b show in an open position and a closed position, respectively, a still further gas flow control device 42, which differs from that shown in FIGS. 6a and 6b in that the guide baffles 82, 82' attached to the damper blade 46 comprise only a section 78, 78' of the shape of a quarter of a circle, with a radius equalling the distance from the pivot axis 50 to the opposite inner surface 64, 66 of the inlet channel 24 in a sector of ninety degrees counter clockwise from the two end sections 76, 76' of the damper blade. Instead of square-like baffle portions attached to the damper blade 46, the gas flow control device of FIGS. 7a and 7b comprises corresponding additional square guide baffles 84, 84' attached to the ceiling 64 and bottom 66 of the inlet channel 24, respectively.

Because the additional baffles 84, 84' do not move when the damper blade is pivoted, the additional guide baffles naturally have to be positioned at different locations around the axis 50 than the guide baffles 82, 82' attached to the damper blade 46. This is seen in FIGS. 7a and 7b in that the additional guide baffles 84, 84' attached to the ceiling and bottom of the inlet channel 24 stay behind the guide baffles 82, 82' when the damper blade is pivoted from the open position to the closed position. It is to be noted that in FIGS. 6a, 6b, 7a and 7b, the lines denoting the inlet and outlet openings, shown as lines 20 and 26 in FIG. 1a, are, for clarity reasons, omitted. The embodiment shown in FIGS. 7a and 7b has the advantage that the weight of the construction attached to the damper blade is minimized when still obtaining an especially efficient gas flow distribution control.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such a combination is technically feasible.

I claim:

1. A filtering system for a flow of dust-laden gas, the filtering system comprising:
   (a) a fabric filter enclosure having at least one inlet opening;
   (b) a gas plenum having a first main flow direction and at least one gas outlet opening in a vertical side wall of the gas plenum for feeding the dust-laden gas to the fabric filter enclosure; and
   (c) an inlet channel from the at least one outlet opening to the at least one inlet opening, the inlet channel having a substantially horizontal second main flow direction differing from the first main flow direction, an inner surface, and a gas flow control device, wherein the gas flow control device comprises:
      (i) a damper blade arranged in the inlet channel and having a general plane and two opposite, substantially planar surfaces with a shape fitted to enable closing of the inlet channel, and two opposite end edges, the damper blade being arranged to be pivoted through a definite pivoting angle around a substantially horizontal pivot axis, wherein the pivot axis is perpendicular to the second main flow direction and passes adjacent to the end edges of the damper blade so as to divide the damper blade to two end sections, for regulating the flow of the dust-laden gas in the inlet channel by pivoting the damper blade between an open position, wherein the general plane of the damper blade is parallel to the second main flow direction, and a closed position; and
      (ii) at least one substantially planar guide baffle attached to each of the two substantially planar surfaces of the damper blade at a distance from the end edges of the damper blade, the at least one guide baffle extending in the open position of the damper blade substantially parallel to the second main flow direction and from the pivot axis in the direction of the normal of the general plane of the damper blade substantially to an opposite inner surface of the inlet channel, for controlling the distribution of the dust-laden gas flow to the fabric filter enclosure.

2. The filtering system according to claim 1, wherein the inlet channel has a rectangular cross section and the shape of the substantially planar surfaces of the damper blade equals the cross section of the inlet channel.

3. The filtering system according to claim 1, wherein the pivot axis passes adjacent to center points of the two end edges of the damper blade.

4. The filtering system according to claim 1, wherein the inlet channel has a length L and a cross section with a height H, wherein the length L is shorter than the height H.

5. The filtering system according to claim 1, wherein the damper blade and the at least one guide baffle are arranged to protrude in the open position of the damper blade to the inlet plenum.

6. The filtering system according to claim 1, wherein the gas flow control device comprises a frame arranged in the inner surface of the inlet channel so as to form a sealing surface for the damper blade.

7. The filtering system according to claim 1, wherein the pivoting angle is about one hundred eighty degrees and the at least one guide baffle extends in all directions from the pivot axis a distance that is at most the distance from the pivot axis to the opposite inner surface of the inlet channel.

8. The filtering system according to claim 7, wherein the at least one guide baffle has a shape comprising an arcuate section having the pivot axis as the center point and including a normal of the general plane of the damper blade passing through the pivot axis, wherein the arcuate section has a radius substantially equalling the distance from the pivot axis to the opposite inner surface of the inlet channel.

9. The filtering system according to claim 7, wherein the at least one guide baffle has a half-circular shape with a radius substantially equalling the distance from the pivot axis to the opposite inner surface of the inlet channel.

10. The filtering system according to claim 7, wherein the gas flow control device comprises at least one additional guide baffle extending substantially parallel to the second main flow direction, the additional guide baffle being attached to the inner surface of the inlet channel in a region that is at a distance from the pivot axis that is greater than the distance from the pivot axis to the opposite inner surface of the inlet channel.

11. The filtering system according to claim 1, wherein the pivoting angle is about ninety degrees, so that when the damper blade is pivoted between the open position and the closed position, each of the end sections of the damper blade covers a pivoting sector of about ninety degrees, as seen from the pivoting axis, and when the damper blade is in the open position, each of the at least one guide baffles extends in a respective pivoting sector from the pivot axis a distance that is at most the distance from the pivot axis to the opposite inner surface of the inlet channel.

12. The filtering system according to claim 11, wherein, when the damper blade is in the open position, each of the at least one guide baffles has, in the respective pivoting sector, a shape of a quarter of a circle with a radius equalling the distance from the pivot axis to the opposite inner surface of the inlet channel.

13. The filtering system according to claim 11, wherein, when the damper blade is in the open position, each of the at least one guide baffles comprises, in a section outside of the respective pivoting sector, a section with a shape of a square with a side length equalling the distance from the pivot axis to the opposite inner surface of the inlet channel.

14. The filtering system according to claim 11, wherein the gas flow control device comprises at least one additional guide baffle arranged outside of the pivoting sectors of the end sections of the damper blade, the at least one additional guide baffle being attached to the inner surface of the inlet channel and extending substantially parallel to the second main flow direction.

15. The filtering system according to claim 14, wherein the at least one additional guide baffle has a shape of a square with a side length equalling the distance from the pivot axis to the opposite inner surface of the inlet channel.

16. The filtering system according to claim 1, wherein multiple guide baffles are attached to each of the two surfaces of the damper blade.

17. The filtering system according to claim 1, wherein the fabric filter enclosure comprises multiple inlet openings, the gas plenum comprises multiple gas outlet openings, and the flue gas filtering system comprises a substantially horizontal inlet channel from each of the multiple outlet openings to one of the inlet openings.

18. The filtering system according to claim 1, wherein the flue gas filtering system comprises two fabric filter enclosures having multiple inlet openings, the flue gas plenum has multiple gas outlet openings in each of two opposite vertical side walls of the gas plenum for feeding the flue gas to each of the two fabric filter enclosures through substantially horizontal inlet channels leading from each of the multiple outlet openings to one of the multiple inlet openings.

* * * * *